United States Patent
Higashiura et al.

(10) Patent No.: US 11,932,083 B2
(45) Date of Patent: Mar. 19, 2024

(54) VEHICLE AIR CONDITIONER

(71) Applicant: TOYOTA JIDOSHA KABUSHIKI KAISHA, Toyota (JP)

(72) Inventors: Ryo Higashiura, Toyota (JP); Takayuki Shimauchi, Toyota (JP); Hidekazu Hirabayashi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/871,183

(22) Filed: Jul. 22, 2022

(65) Prior Publication Data
US 2023/0027333 A1    Jan. 26, 2023

(30) Foreign Application Priority Data

Jul. 26, 2021   (JP) .................... 2021-121327

(51) Int. Cl.
*B60H 1/32*    (2006.01)
(52) U.S. Cl.
CPC .................. *B60H 1/3222* (2013.01)
(58) Field of Classification Search
CPC ............ B60H 1/3222; B60H 1/00742; B60H 1/3208; B60H 2001/3272; B60H 2001/3266
See application file for complete search history.

(56) References Cited

U.S. PATENT DOCUMENTS

| | | | | |
|---|---|---|---|---|
| 5,658,132 A | * | 8/1997 | Akazawa ............. | B60H 1/3222 318/803 |
| 2019/0285510 A1 | * | 9/2019 | Dewolf ................. | G01M 7/022 |
| 2019/0382048 A1 | * | 12/2019 | Sawada ............... | B62D 15/0245 |
| 2021/0164869 A1 | * | 6/2021 | Loussaut ............... | G01M 17/06 |

FOREIGN PATENT DOCUMENTS

| | | | | |
|---|---|---|---|---|
| CN | 104029683 A | * | 9/2014 | ........... B62D 15/025 |
| CN | 106394676 A | * | 2/2017 | ............. B62D 15/02 |
| CN | 110588290 A | * | 12/2019 | |
| CN | 112424053 A | * | 2/2021 | ............. B62D 1/181 |
| JP | 2001-026214 A | | 1/2001 | |
| JP | 4258905 B2 | * | 4/2009 | |
| JP | 2019-188851 A | | 10/2019 | |

* cited by examiner

*Primary Examiner* — Nelson J Nieves
(74) *Attorney, Agent, or Firm* — Dinsmore & Shohl LLP

(57) ABSTRACT

A vehicle air conditioner has a refrigeration cycle system including a compressor. The rotational frequency of the compressor is variably controlled, and the compressor is prevented from being operated within a resonating rotational frequency range of the compressor in which the vibration frequency of the compressor and the natural frequency of a steering device resonate with each other. When the vehicle performs automated driving, the compressor is also allowed to operate within the resonating rotational frequency range.

2 Claims, 6 Drawing Sheets

VEHICLE AIR CONDITIONER

CROSS REFERENCE TO RELATED APPLICATION

This application claims priority to Japanese Patent Application No. 2021-121327 filed on Jul. 26, 2021, which is incorporated herein by reference in its entirety, including the specification, claims, drawings, and abstract.

TECHNICAL FIELD

The present disclosure relates to a vehicle air conditioner that controls the rotational frequency of a compressor to avoid resonance with a steering device.

BACKGROUND

A vehicle air conditioner is a device for providing air conditioning inside a cabin of a vehicle, and comprises a refrigeration cycle system including a compressor. The compressor is subjected to capacity control performed in accordance with a cooling load or heating load. The capacity control of the compressor is performed by controlling the rotational frequency of an electric motor that drives the compressor.

The compressor is fixedly supported on an air conditioning unit fixed to a vehicle body. Further, a steering device is fixedly supported on an instrument panel reinforcement (not shown in drawings) fixed to the vehicle body. Accordingly, vibrations caused by operation of the compressor are transmitted to the steering device.

When the vibration frequency (or rotational frequency) of the compressor and the natural frequency of the steering device resonate with each other, a person on board gripping the steering wheel of the steering device experiences unpleasantness. In view of this, JP 2001-026214 A discloses a vehicle air conditioner in which the compressor is prevented from being operated steadily at a compressor rotational frequency at which the vibration frequency of the compressor and the natural frequency of the steering device resonate with each other.

In controlling the compressor rotational frequency to avoid resonance with the steering device as noted above, the upper limit rotational frequency of the compressor is set at a low value in order to specifically avoid high-order resonance points. In that state, since the compressor is operated at a predetermined rotational frequency or lower, a time delay until the temperature inside the vehicle cabin reaches a preset temperature is likely to occur.

In recent years, vehicles that perform automated driving that enables autonomous travel without having a person on board carry out driving manipulations are widely used. During automated driving, there are frequently situations in which the person on board is not holding the steering wheel, and in such situations, there is no need to perform the control of the compressor rotational frequency for avoiding resonance with the steering device as described above.

In light of the foregoing, the present disclosure is directed to providing a vehicle air conditioner capable of reducing the time delay until the temperature inside the vehicle cabin reaches a preset temperature.

SUMMARY

A vehicle air conditioner according to the present disclosure has a refrigeration cycle system including a compressor, wherein the rotational frequency of the compressor is variably controlled, and the compressor is prevented from being operated within a resonating rotational frequency range of the compressor in which the vibration frequency of the compressor and the natural frequency of a steering device resonate with each other, and further wherein the compressor is also operated within the resonating rotational frequency range in cases where the vehicle performs automated driving.

In some embodiments, the vehicle air conditioner according the present disclosure, in cases where manipulation of the steering device is performed by a person on board even when the vehicle performs automated driving, the compressor is prevented from being operated within the resonating rotational frequency range.

With the vehicle air conditioner according to the present disclosure, the time delay until the temperature inside the vehicle cabin reaches a preset temperature can be reduced.

BRIEF DESCRIPTION OF DRAWINGS

Embodiment(s) of the present disclosure will be described based on the following figures, wherein.

DESCRIPTION OF EMBODIMENTS

An example embodiment of the present disclosure will be described below in detail. Specific shapes, materials, directions, numerical values, and the like in the following description are referred to simply by way of examples to facilitate understanding of the present disclosure, and can be changed as appropriate in accordance with applications, purposes, specifications, and the like.

Figure 1:
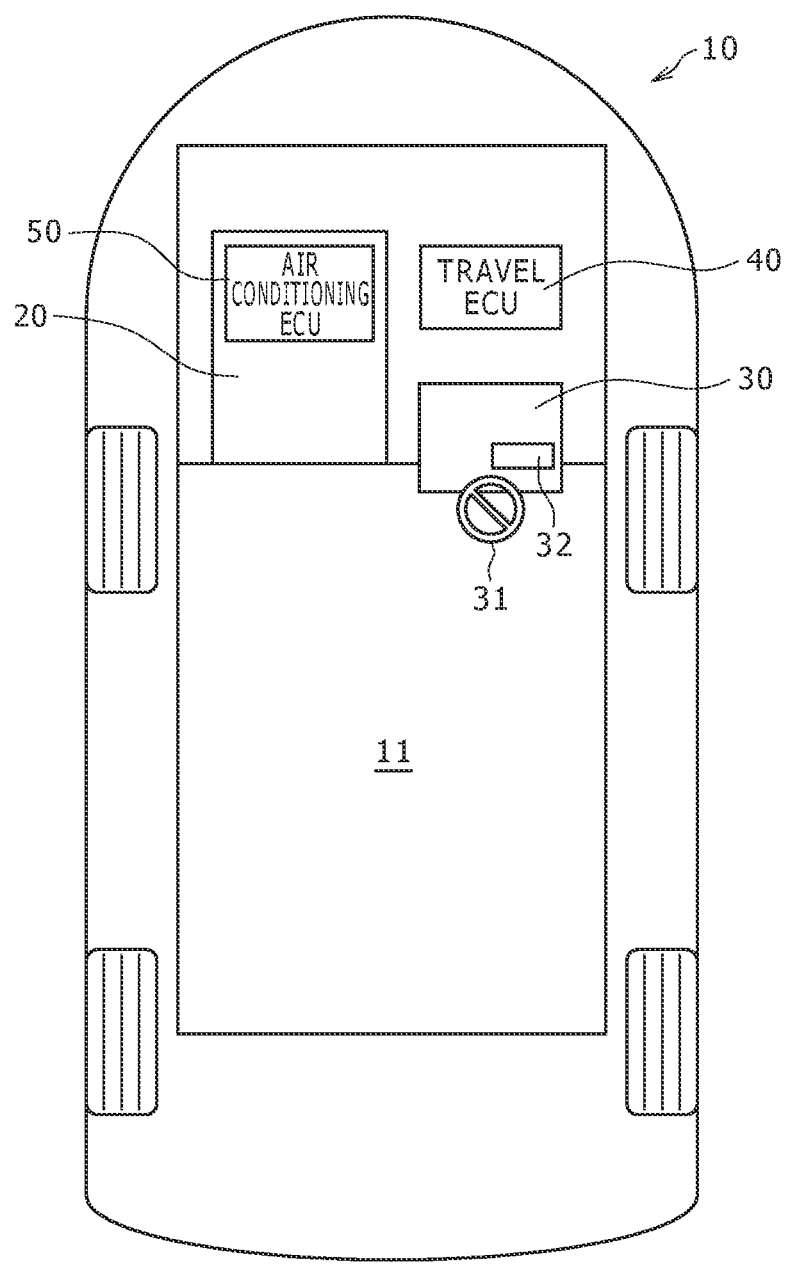
FIG. 1 is a schematic diagram showing a vehicle relating to an embodiment.

A vehicle 10 relating to the embodiment will now be described by reference to FIG. 1.

The vehicle 10 comprises a vehicle air conditioner 20 according to the present disclosure. The vehicle 10 of the present embodiment is an electric vehicle in which a motor is driven by electric power supplied from a battery, and which travels using power from the motor as the motive power. Alternatively, the vehicle 10 may for example be a hybrid vehicle or an engine vehicle.

The vehicle 10 includes the above-noted vehicle air conditioner 20 that provides air conditioning inside the vehicle cabin 11, a steering device 30 for arbitrarily changing the travel direction of the vehicle 10, and a travel ECU (electric control unit) 40 that controls travel of the vehicle 10. The vehicle air conditioner 20 comprises an air conditioning ECU 50 that adjusts respective instruments of the vehicle air conditioner 20. Details of the vehicle air conditioner 20 and the air conditioning ECU 50 will be given further below.

The steering device 30 includes a steering wheel 31 which is to be rotationally manipulated by a person on board for changing the orientation of wheels, and a steering wheel grip sensor 32 that detects a state of the steering wheel 31 being gripped by a person on board.

In detecting a state of the steering wheel 31 being gripped by a person on board, the steering wheel grip sensor 32 may use an electrostatic sensor that detects capacitance provided in the steering wheel 31 when a person on board grips the steering wheel 31. Alternatively, in detecting a state of the steering wheel 31 being gripped by a person on board, the steering wheel grip sensor 32 may use a torque sensor that detects a torque applied when a person on board rotates the steering wheel 31.

The travel ECU 40 has an automated driving function that causes the vehicle 10 to travel autonomously without having a person on board perform driving manipulations. In the present embodiment, the automated driving function is a function to cause the vehicle to travel autonomously at least without having a person on board manipulate the steering wheel 31. The automated driving function includes an automatic steering function to automatically perform operation of the steering device 30 during travel of the vehicle 10, and a parking assist function to automatically perform operation of the steering device 30 during a parking operation of the vehicle 10.

Figure 2:
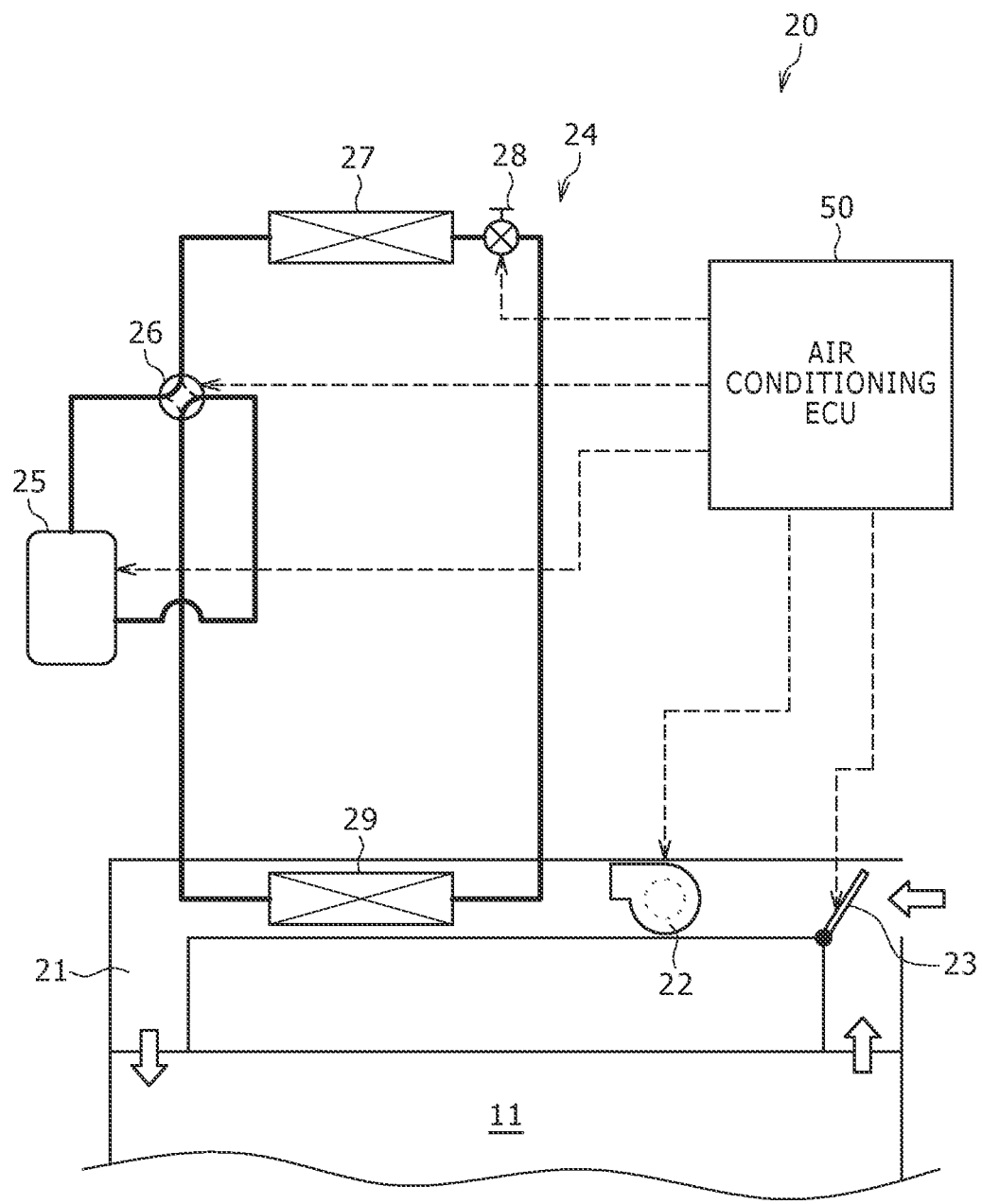
FIG. 2 is a schematic diagram showing a vehicle air conditioner according to an example embodiment.

The vehicle air conditioner 20 will now be described by reference to FIG. 2.

The vehicle air conditioner 20 is a device that cools or heats the vehicle cabin 11, and comprises an air passageway 21 that supplies temperature-adjusted air to the vehicle cabin 11, a blower 22 that generates an air flow toward the vehicle cabin 11, an inside/outside air switching door 23 that switches between introduction of air of the vehicle cabin 11 (inside air) and introduction of outside air, a refrigeration cycle system 24 described in detail below, and the air conditioning ECU 50 described in detail further below.

The refrigeration cycle system 24 is constituted by connecting a compressor 25 that compresses a coolant, a four-way selector valve 26 that switches between a cooling operation and a heating operation, an outdoor heat exchanger 27 disposed at a front part of the vehicle body of the vehicle 10, an expansion valve 28 that causes the coolant to expand, and an indoor heat exchanger 29 disposed in the air passageway 21.

As the compressor 25, a scroll compressor is suitably used, and capacity control is performed in accordance with a cooling load or heating load of the vehicle cabin 11. The capacity control of the compressor 25 is performed by variably controlling the rotational frequency of an electric motor that drives the compressor 25.

The compressor 25 is fixedly supported on an air conditioning unit fixed to the vehicle body (not shown in drawings). Further, the above-described steering device 30 is fixedly supported on an instrument panel reinforcement (not shown in drawings) fixed to the vehicle body of the vehicle 10. Accordingly, vibrations caused by operation of the compressor 25 are transmitted to the steering device 30.

When the vibration frequency (or rotational frequency) of the compressor 25 and the natural frequency of the steering device 30 resonate with each other, a person on board gripping the steering wheel 31 of the steering device 30 experiences unpleasantness. In view of this, in variably controlling the rotational frequency of the compressor 25 during operation of the compressor 25, a first compressor controller 55 of the air conditioning ECU 50 described further below prevents the compressor 25 from being operated in a range higher than or equal to a predetermined rotational frequency and including high-order resonance points at which the vibration frequency (or rotational frequency) of the compressor 25 and the natural frequency of the steering device 30 resonate with each other.

The four-way selector valve 26 switches between a cooling operation in which the coolant discharged from the compressor 25 is supplied to the outdoor heat exchanger 27 so that the outdoor heat exchanger 27 is caused to act as a condenser while the indoor heat exchanger 29 is caused to act as an evaporator, and a heating operation in which the coolant discharged from the compressor 25 is supplied to the indoor heat exchanger 29 so that the indoor heat exchanger 29 is caused to act as a condenser while the outdoor heat exchanger 27 is caused to act as an evaporator.

The air conditioning ECU 50 will now be described by reference to FIGS. 3 to 5.

As noted above, the air conditioning ECU 50 controls the vehicle air conditioner 20. As described in detail further below, in variably controlling the rotational frequency of the compressor 25, in cases where automated driving of the vehicle 10 is executed and no person on board is gripping the steering wheel 31, the air conditioning ECU 50 also operates the compressor 25 within the range higher than or equal to the predetermined rotational frequency and including high-order resonance points at which the vibration frequency of the compressor 25 and the natural frequency of the steering device 30 resonate with each other. With this feature, occasions when the compressor 25 is operated at a high rotational frequency become more frequent, so that the time delay until the temperature inside the vehicle cabin 11 reaches a preset temperature can be reduced.

The air conditioning ECU 50 comprises a CPU (central processing unit) which is an arithmetic processor, and memory units such as a RAM (random access memory) and a ROM (read-only memory). By employing the temporary storage function of a RAM, the air conditioning ECU 50 performs signal processing according to a program stored in advance in a ROM.

Figure 3:
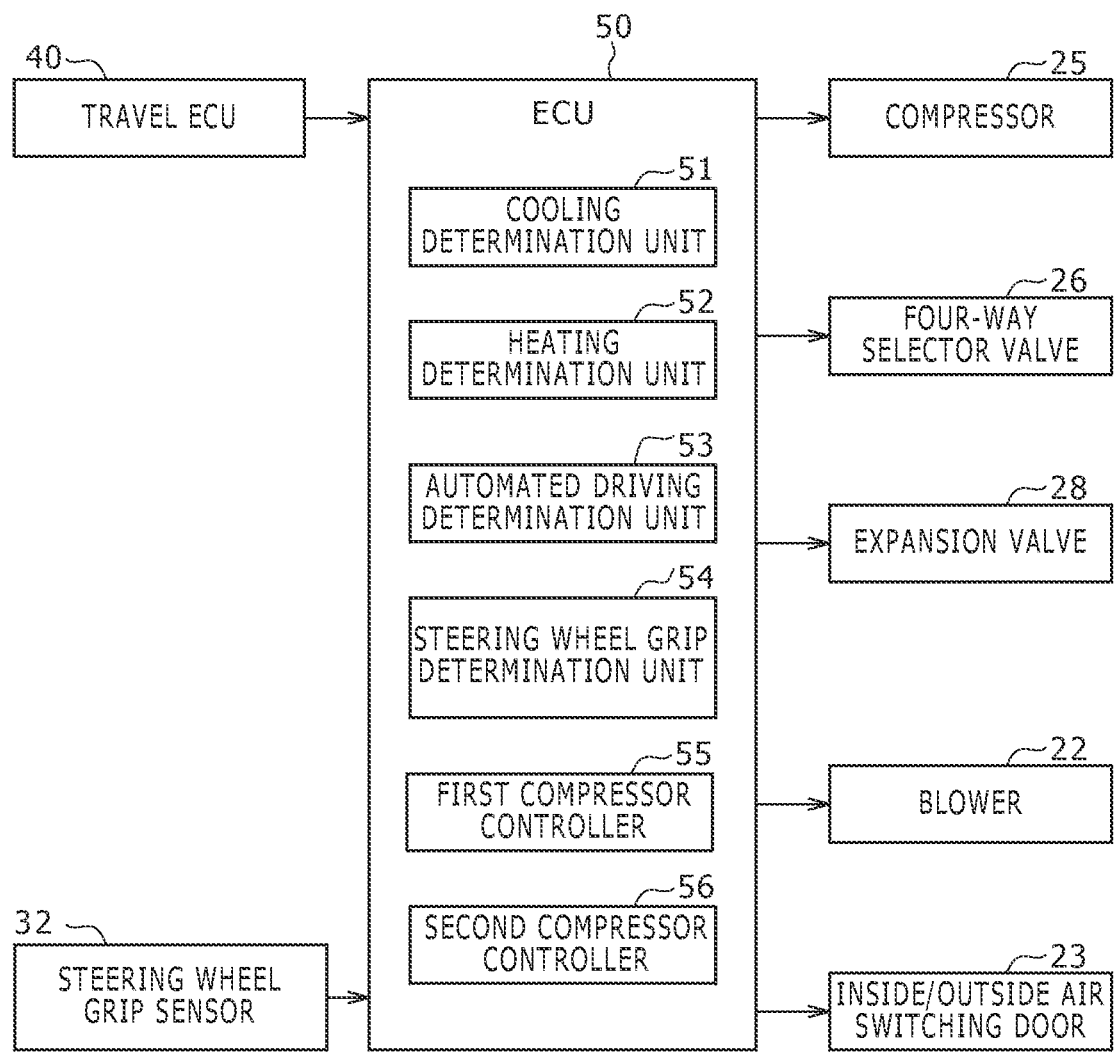
FIG. 3 is a block diagram showing a control configuration of the vehicle air conditioner.

As shown in FIG. 3, the air conditioning ECU 50 is connected to the blower 22, the inside/outside air switching door 23, the compressor 25, the four-way selector valve 26, the expansion valve 28, the steering wheel grip sensor 32, and the travel ECU 40. The air conditioning ECU 50 receives signals transmitted from the steering wheel grip sensor 32 and the travel ECU 40, and transmits signals to the compressor 25 and the like.

The air conditioning ECU 50 includes: a cooling determination unit 51 that determines whether a cooling operation is performed; a heating determination unit 52 that determines whether a heating operation is performed; an automated driving determination unit 53 that determines whether automated driving is being executed; a steering wheel grip determination unit 54 that determines, by the steering wheel grip sensor 32, whether a person on board is gripping the steering wheel 31; a first compressor controller 55 that variably controls the rotational frequency of the compressor 25 to avoid resonance with the steering device 30; and a second compressor controller 56 that, in cases where automated driving is being executed and no person on board is gripping the steering wheel 31, variably controls the rotational frequency of the compressor 25 without avoiding resonance with the steering device 30.

The first compressor controller 55 controls the rotational frequency of the compressor 25 in accordance with a cooling load or heating load of the vehicle cabin 11. The cooling load or heating load of the vehicle cabin 11 is denoted as a target air outlet temperature calculated from the preset temperature, the temperature inside the vehicle cabin 11 (or vehicle cabin temperature), the temperature outside the vehicle 10, the degree of opening of the inside/outside air switching door 23, and the like.

Further, as noted above, the first compressor controller 55 variably controls the rotational frequency of the compressor 25 to avoid resonance with the steering device 30. More specifically, the upper limit rotational frequency of the compressor 25 is set such that the compressor 25 is prevented from being operated in a range higher than or equal to a predetermined rotational frequency and including high-order resonance points at which the vibration frequency (or rotational frequency) of the compressor 25 and the natural frequency of the steering device 30 resonate with each other.

Figure 4:
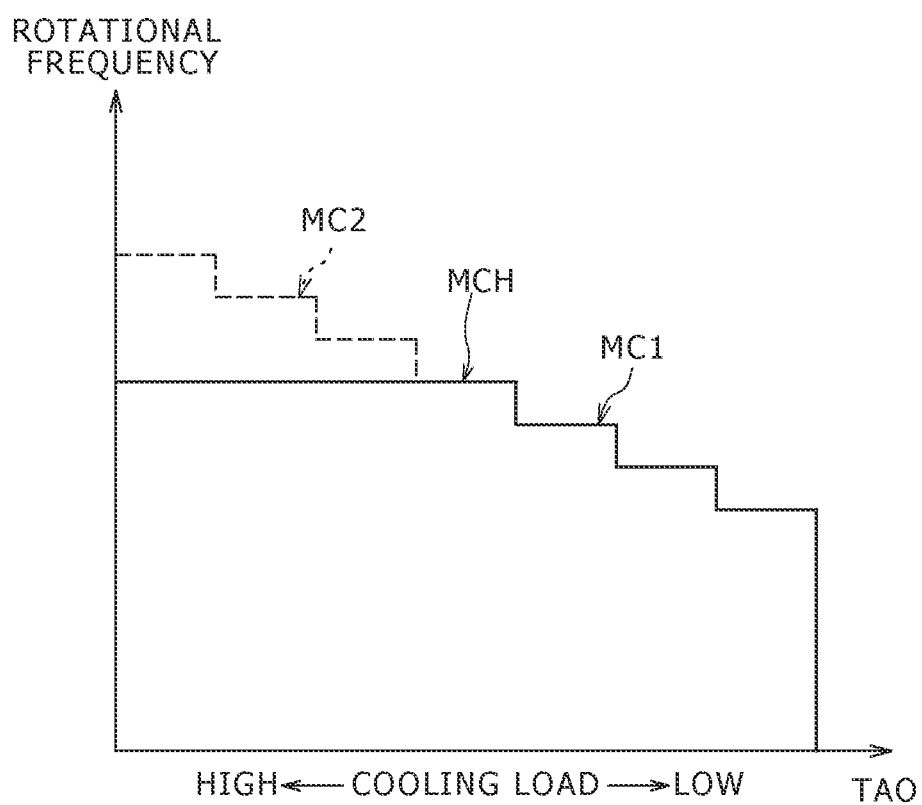
FIG. 4 is a graph showing a first rotational frequency map and a second rotational frequency map for a compressor during a cooling operation.

As shown in FIG. 4, during a cooling operation, the first compressor controller 55 variably controls the rotational frequency of the compressor 25 according to a first rotational frequency map MC1. In the first rotational frequency map MC1, the upper limit rotational frequency of the compressor 25 is set (as shown in solid lines in the figure) according to the target air outlet temperature (TAO in the figure) denoting the air conditioning load (i.e., cooling load). More specifically, the upper limit rotational frequency of the compressor 25 is set higher as the cooling load becomes higher (i.e., as the target air outlet temperature becomes lower). Further, as noted above, the upper limit rotational frequency of the compressor 25 is limited to MCH in order to avoid points of resonance with the natural frequency of the steering device 30.

Figure 5:
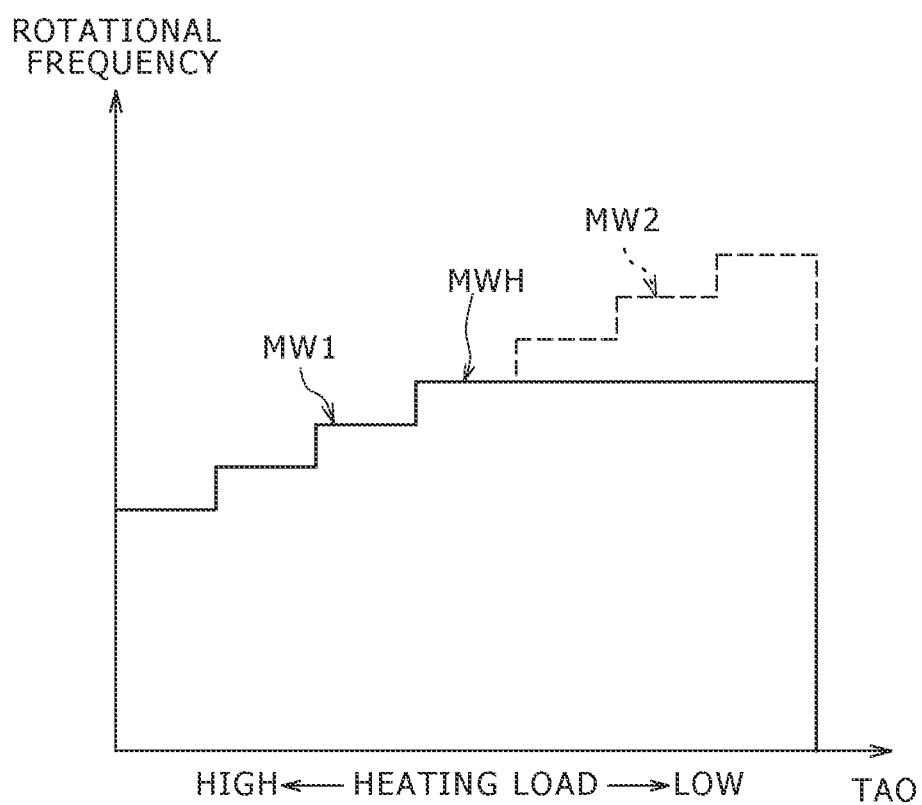
FIG. 5 is a graph showing a first rotational frequency map and a second rotational frequency map for the compressor during a heating operation.

As shown in FIG. 5, during a heating operation, the first compressor controller 55 variably controls the rotational frequency of the compressor 25 according to a first rotational frequency map MW1. In the first rotational frequency map MW1, the upper limit rotational frequency of the compressor 25 is set (as shown in solid lines in the figure) according to the target air outlet temperature (TAO in the figure) denoting the air conditioning load (i.e., heating load). More specifically, the upper limit rotational frequency of the compressor 25 is set higher as the heating load becomes higher (i.e., as the target air outlet temperature becomes higher). Further, as noted above, the upper limit rotational frequency of the compressor 25 is limited to MWH in order to avoid points of resonance with the natural frequency of the steering device 30.

The second compressor controller 56 variably controls the rotational frequency of the compressor 25 in accordance with a cooling load or heating load of the vehicle cabin 11. Further, as noted above, the second compressor controller 56 variably controls the rotational frequency of the compressor 25 without avoiding resonance with the steering device 30.

Referring again to FIG. 4, during a cooling operation, the second compressor controller 56 variably controls the rotational frequency of the compressor 25 according to a second rotational frequency map MC2. In the second rotational frequency map MC2, the upper limit rotational frequency of the compressor 25 is set (as shown in dashed lines in the figure) according to the target air outlet temperature (TAO in the figure) denoting the air conditioning load (i.e., cooling load). Here, when the cooling load is high (i.e., the target air outlet temperature is low), the upper limit rotational frequency of the compressor 25 is set to a value higher than that in the first rotational frequency map MC1, without avoiding points of resonance with the natural frequency of the steering device 30.

Referring again to FIG. 5, during a heating operation, the second compressor controller 56 variably controls the rotational frequency of the compressor 25 according to a second rotational frequency map MW2. In the second rotational frequency map MW2, the upper limit rotational frequency of the compressor 25 is set (as shown in dashed lines in the figure) according to the target air outlet temperature (TAO in the figure) denoting the air conditioning load (i.e., heating load). Here, when the heating load is high (i.e., the target air outlet temperature is high), the upper limit rotational frequency of the compressor 25 is set to a value higher than that in the first rotational frequency map MW1, without avoiding points of resonance with the natural frequency of the steering device 30.

Figure 6:
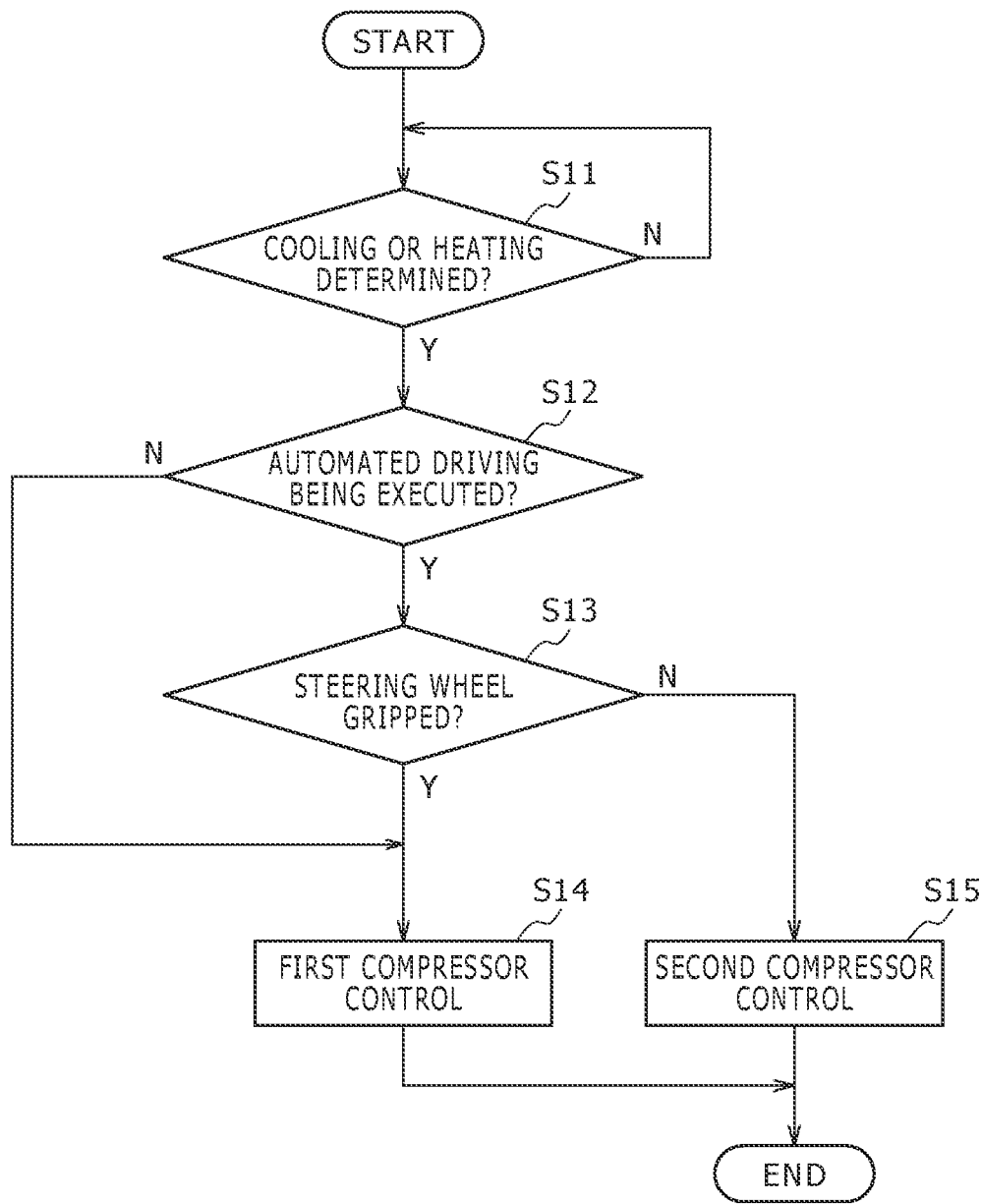
FIG. 6 is a flow diagram illustrating operation control of the compressor.

A flow of operation control of the compressor 25 by the air conditioning ECU 50 is now described by reference to FIG. 6.

In step S11, whether a cooling operation or heating operation is being executed is determined by the cooling determination unit 51 or the heating determination unit 52. When a cooling operation or heating operation is being executed, the flow proceeds to step S12.

In step S12, whether automated driving is being executed is determined by the automated driving determination unit 53. When automated driving is being executed, the flow proceeds to step S13. As mentioned above, automated driving includes an automated steering function to automatically perform operation of the steering device 30 during travel of the vehicle 10, and a parking assist function to automatically perform operation of the steering device 30 during a parking operation of the vehicle 10. With step S12, cases where automated driving is being executed, while it is presumed that a person on board is often not holding the steering wheel 31, are detected. When automated driving is not being executed, the flow proceeds to step S14.

In step S13, whether a person on board is gripping the steering wheel 31 is determined by the steering wheel grip determination unit 54. When a person on board is gripping the steering wheel 31, the flow proceeds to step S14. With step S13, cases where a person on board is gripping the steering wheel 31 even when automated driving is being executed are detected. When no person on board is gripping the steering wheel 31, the flow proceeds to step S15.

In step S14, by the first compressor controller 55, the rotational frequency of the compressor 25 is variably controlled according to the first rotational frequency map MC1 in the case of a cooling operation, or according to the first rotational frequency map MW1 in the case of a heating operation. With this step, the compressor 25 is prevented from being operated at the predetermined rotational frequency or higher, so that resonance between the vibration frequency of the compressor 25 and the natural frequency of the steering device 30 is avoided, and the person on board gripping the steering wheel 31 does not experience unpleasantness.

In step S15, by the second compressor controller 56, the rotational frequency of the compressor 25 is variably controlled according to the second rotational frequency map MC2 in the case of a cooling operation, or according to the second rotational frequency map MW2 in the case of a heating operation. At this time, since the compressor 25 is operable at the predetermined rotational frequency or higher, the cooling performance or heating performance can be enhanced. With this step, occasions when the compressor 25 is operated at a high rotational frequency become more frequent, so that the time delay until the temperature inside the vehicle cabin 11 reaches the preset temperature can be reduced.

According to the operation control of the compressor 25 according to the present embodiment, when automated driving is executed and no person on board is gripping the steering wheel 31, the compressor 25 is operated even at the predetermined rotational frequency of the compressor 25 or higher, without avoiding resonance between the vibration frequency of the compressor 25 and the natural frequency of the steering device 30. As a result, occasions when the compressor 25 is operated at a high rotational frequency become more frequent, so that the time delay until the temperature inside the vehicle cabin 11 reaches the preset temperature can be reduced.

The present disclosure is not limited to the embodiment and its variants described above, and it is obvious that various changes and improvements can be made within the scope of subject matter defined by the appended claims.

While the present embodiment was described in relation to a case where the vehicle 10 is an electric vehicle, when the vehicle 10 is an engine vehicle, heating operations are carried out using engine exhaust heat, so that the operation control of the compressor 25 according to the present embodiment applies only to cooling operations.

The invention claimed is:

1. A vehicle air conditioner, comprising a refrigeration cycle system including a compressor, wherein a rotational frequency of the compressor is variably controlled, and the compressor is prevented from being operated within a resonating rotational frequency range of the compressor in which a vibration frequency of the compressor and a natural frequency of a steering device resonate with each other, and
   further wherein the compressor is also operated within the resonating rotational frequency range in cases where a vehicle performs automated driving and where manipulation of the steering device is not being performed by a person on board.

2. The vehicle air conditioner according to claim 1, wherein
   in cases where manipulation of the steering device is performed by a person on board even when the vehicle performs automated driving, the compressor is prevented from being operated within the resonating rotational frequency range.

* * * * *